United States Patent Office 3,634,525
Patented Jan. 11, 1972

3,634,525
HALOTRIFLUOROCYCLOPROPENES
Archie E. Barkdoll, Hockessin, Del., and Peter B. Sargent, Waynesboro, Va., assignors to E. I. du Pont de Nemours and Company, Wilmington, Del.
No Drawing. Original application May 6, 1966, Ser. No. 548,068, now Patent No. 3,418,275, dated Nov. 26, 1968. Divided and this application May 28, 1968, Ser. No. 823,195
Int. Cl. C07c 23/04
U.S. Cl. 260—648 F
3 Claims

ABSTRACT OF THE DISCLOSURE

Halotrifluorocyclopropenes having the formula

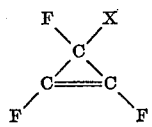

wherein X is fluorine, chlorine or bromine can be prepared by dehalogenation of

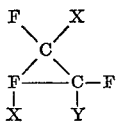

wherein Y is chlorine or bromine, or by dehydrohalogenation of

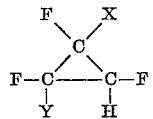

The compounds can be copolymerized with ethylenically unsaturated monomers to form useful polymers, and are also useful as insecticides.

---

RELATED APPLICATIONS

This application is a division of application S.N. 548,068 filed May 6, 1966.

DESCRIPTION OF THE INVENTION

This invention relates to fluorinated cyclopropenes, their copolymers and the preparation of both.

More specifically, the invention is directed to 3-halotrifluorocyclopropenes and their copolymers with polymerizable ethylenically unsaturated monomers. The novel monomers of this invention are represented by the structural formula

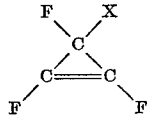

wherein X is fluorine, chlorine or bromine. Preferably X is fluorine.

The monomers of the invention can be prepared by two methods, one being the dehydrohalogenation of a cyclopropane of the formula

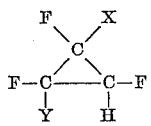

and the other, which is the preferred method, being the dehalogenation of a compound of the formula

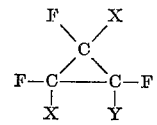

In these formulas X is as defined previously and Y is chloroine or bromine. The dehydrohalogenation and dehalogenation processes are, in general, well-known reactions and are discussed in such references as "Chemie and Technologic Aiphatischer Fluroorganischer Verbindungen," D. Osteroth, F. Enke, Verlag, Stuttgart, 1964, pp. 26–37. Dehydrohalogenation reactions are discussed in "Aliphatic Fluorine Compounds," A. M. Lovelace et al., Reinhold Publishing Corp., New York, N.Y., 1958, pp. 101–104; and in "Tetrahedron Letters," No. 29, 1945 (1964), M. Schlosser et al. Dehalogenation reactions are discussed in "Aliphatic Fluorine Compounds," supra, pp. 104–105.

In the dehydrohalogenation reaction, the cyclopropane compound is reacted with a base. Normally an excess of base is used, although the reaction proportions are not critical. Neither pressure nor reaction time is critical, and usually atmospheric pressure and a time sufficient to form the product are employed. Effective bases include molten alkali or alkaline earth metal hydroxides; alkali or alkaline earth metal hydroxide suspensions in, e.g., ethers such as dibutyl ether, dioctyl ether, dioxane, diethyl ether and the like; lower alkyl alkali metal (e.g., methyllithium, butyllithium, propylsodium, or ethylpotassium) suspensions in ethers such as in the preceding sentence, or in hydrocarbons such as benzene, hexane, cyclohexane, and the like; or sodium hydride in dimethylformamide. Reaction temperatures depend upon the base employed and will range between —10° to about 165° C., and preferably between 25° and 165° C. Representative hydroxides include the hydroxides of lithium, potassium, sodium, cesium, calcium, magnesium, barium, strontium, and the like.

In the preferred dehalogenation method, the cyclopropane compound is reacted with, preferably, an excess of a dehalogenation reagent such as zinc dust, activated with zinc bromide, mercuric chloride or hydrochloric acid, in ethanol; zinc in tetrahydrofuran or acetic anhydride; magnesium in tetrahydrofuran; and the like. As can be seen, the reaction media include alcohols, ethers, and the like. Pressure is not critical and atmospheric pressures are usually employed. The reaction proceeds in air or under an inert atmosphere such as nitrogen or helium at temperatures of between about 25° to 60° C. Reaction times of several hours up to several days are ordinarily used.

The novel monomers so produced are colorless gases or low-boiling liquids, e.g., tetrafluorocyclopropene boils at about —13° C., melts at about —60° C. and is stable for several hours at 100° C., and is stable indefinitely at room temperature. Thus, in both processes the novel products can be obtained by trapping the gases produced in the reaction and separating the novel monomer from reactants and byproducts by conventional means such as fractional distillation or gas chromatography. In general, they are explosive and easily ignited. Thus, special precautions should be taken throughout the preparation.

The novel polymers of this invention are copolymers of the above-described novel monomers with polymerizable ethylenically unsaturated monomers and are prepared by conventional free-radical initiated polymerization.

The ethylenically unsaturated monomers include unsaturated hydrocarbons such as ethylene, propylene, isobutylene, and styrene; halogenated compounds such as 1,1-difluoroethylene (vinylidene fluoride), 1,1-difluoro-2-chloroethylene, trifluoroethylene, chlorotrifluoroethylene, hexafluoropropene, and particularly the vinyl halides such as vinyl fluoride, vinyl chloride, and vinyl bromide; vinyl carboxylates, such as vinyl formate, acetate, vinyl benzoate, and vinyl esters of higher aliphatic carboxylic acids; esters, nitriles, amides, anhydrides, and acid halides of α-methylene monocarboxylic acids such as methyl methacrylate, methyl acrylate, methyl-α-chloroacrylate, acrylonitrile, methacrylic amides, methacrylic acid anhydride, and methacrylic acid fluoride; vinyl ethers such as vinyl ethyl ether and vinyl butyl ether; vinyl ketones, such as vinyl methyl ketone and vinyl phenyl ketone; N-vinyl compounds, such as N-vinyl succinimide, N-vinylphthalimide and N-vinyl carbazole; the esters of vinylene dicarboxylic acids, such as dimethyl fumarate and diethyl fumarate; compounds having more than one ethylenic double bond, such as 2-fluoro-1,3-butadiene, 2-chloro-1,3-butadiene, and 2-cyano-1,3-butadiene, and compounds containing acetylenic unsaturation in addition to the ethylenic double bond, for example, monovinylacetylene, divinylacetylene, and vinyl (ethinyl)-carbinols.

Of the classes of polymerizable ethylenically unsaturated monomers above, terminally unsaturated monomers such as vinyl monomers are preferred. Thus, these preferred classes include the vinyl halides, vinyl carboxylates, esters, nitriles, amides, anhydrides and acid halides of α-methylene monocarboxylic acids, and vinyl ethers. Especially preferred are fluoroolefin comonomers, such as tetrafluoroethylene, chlorotrifluoroethylene, vinylidene fluoride, vinyl fluoride, trifluoromethyl trifluorovinyl ether, hexafluoropropylene, and the like.

The copolymers are prepared by reacting one or more of the monomers of this invention with one or more of the ethylenically unsaturated monomers, either in bulk or in an inert media such as acrylonitrile, 1,1,2-thichloro-1,2,2-trifluoroethane, water, and the like, in the presence of a free-radical initiator such as azoisobutyronitrile, benzoyl peroxide, di-t-butyl peroxide, dinitrogen difluoride, perfluoropropionyl peroxide, and the like. The reaction conditions are well known and are employed as described in, for example, U.S. Pat. 2,468,664. Reactant ratios are not critical and thus, monomer ratios in the resulting copolymers are likewise not critical.

The following examples further illustrate the novel monomers and copolymers of this invention and their preparation.

EXAMPLE 1

Tetrafluorocyclopropene and 3-chlorotrifluorocyclopropene

Potassium hydroxide (20 g.) was heated by an oil bath to 160–165° C. in a 50-ml. 3-neck round-bottom flask equipped with an addition funnel, magnetic stirrer, and water condenser leading to a "Dry Ice"-acetone cooled trap. 1-chloro-1,2,3,3-tetrafluorocyclopropane (1.0 g., 0.067 mole) was added rapidly to the stirring molten potassium hydroxide. The reaction mixture turned dark and gas evolution occurred. Vapor phase chromatography of the gaseous product showed the presence of several products, two of which were identified as being tetrafluorocyclopropene and 3-chlorotrifluorocyclopropene.

EXAMPLE 2

Tetrafluorocyclopropene and 3-flutrifluorocyclopropene

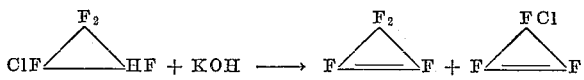

Aqueous potassium hydroxide (150 g. in 30 ml. of H₂O) was heated to 90° C. in a 500-ml. 3-neck round-bottom flask equipped with a mechanical stirrer, a 50-ml. addition funnel, and a cold water condenser leading to a 50-ml. trap cooled in "Dry Ice"-acetone. 1-chloro-1,2,3,3-tetrafluorocyclopropane (49.5 g., 0.33 mole) was slowly added to the stirring mixture over 30 minutes. There was obtained 21 ml. of product (34 g.) which contained 14% perfluorocyclopropene, 86% 1-chloro-1,2,3,3-tetrafluorocyclopropane and a small amount of 3-chloro-1,2,3-trifluorocyclopropene, as determined by vapor phase chromatography. Distillation of the product through a 40-cm. low temperature distillation column gave perfluorocyclopropene (4.0 g., B.P. −22 to −15° C.).

EXAMPLE 3

Tetrafluorocyclopropene and 3-chlorotrifluorocyclopropene

Potassium hydroxide (85%, 30 g.) was heated to 165° C. in a 50-ml. 3-neck round-bottom flask equipped with an addition funnel, a mechanical stirrer, and a reflux condenser with a line heading to a trap cooled in "Dry Ice"-acetone followed by a trap cooled in liquid Na. The system was continuously swept with a slow flow of helium. 1-chloro-1,2,3,3-tetrafluorocyclopropane (2 g., 0.012 mole) was quickly added to the stirring molten potassium hydroxide. There was obtained 0.7 ml. of liquid in the "Dry Ice" cooled trap which was shown to be a mixture of perfluorocyclopropene, 3-chlorotrifluorocyclopropene and starting material by vapor phase chromatography and infrared spectrometry. Perfluorocyclopropene and 3-chlorotrifluorocyclopropene were separated by vapor phase chromatography and subject to mass spectrometry for confirmation of structures.

EXAMPLE 4

Perfluorocyclopropene

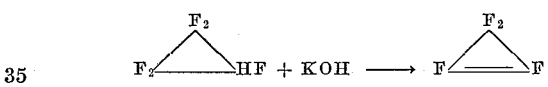

Aqueous potassium hydroxide (200 g. in 400 ml. of H₂O) was heated to 95° C. in a 1-liter 3-neck round-bottom flask equipped with a mechanical stirrer, gas inlet tube reaching below the surface of the liquid, and a condenser leading to a 50-ml. trap cooled in "Dry Ice"-acetone. Pentafluorocyclopropane (38 g., 0.29 mole) was slowly bubbled through the stirring solution (6 hours). The final portion was passed through by sweeping with N for 15 minutes. There was obtained 15.5 ml. of product (25 g.) which was found to consist of 24% perfluorocyclopropene and 86% pentafluorocyclopropane by vapor phase chromatography.

EXAMPLE 5

Perfluorocyclopropene

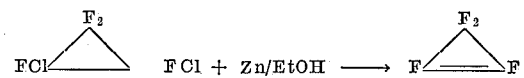

Zinc dust (15 g.) and zinc bromide (1.5 g.) were suspended in absolute ethanol (20 ml.) in a 50-ml. 3-neck round bottom flask equipped with an addition funnel, mechanical stirrer, and a condenser with a line leading to a trap cooled in "Dry Ice"-acetone. 1,2-dichloro-1,2,3,3-tetrafluorocyclopropane (5.0 g., 0.027 mole) in absolute ethanol (5 ml.) was added to the stirring suspension. The temperature was maintained at 30° C. for 2 hours, 35° C. for 2 hours, and 50° C. for 18 hours. There was obtained 1.7 ml. of liquid in the trap which was shown to be a mixture of perfluorocyclopropene (67%) and starting material (33%) by vapor phase chromatography.

EXAMPLE 6

Tetrafluorocyclopropene

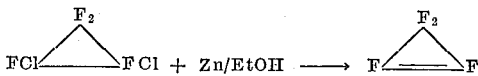

Zinc dust (220 g., 3.3 mole) and zinc bromide (22 g.) were suspended in ethanol (300 ml.) in a 1-liter 3-neck round-bottom flask equipped with a 250-ml. addition funnel, mechanical stirrer, and cold water condenser leading to a 50-ml. trap cooled in "Dry Ice"-acetone, and heated to 55° C. under $N_2$. 1,2-dichloro-1,2,3,3-tetrafluorocyclopropane (136 g., 0.74 mole) in ethanol (75 ml.) was slowly added to the stirring suspension. After 18 hours the system was swept with $N_2$ for 15 minutes. The product (50 ml.), collected in the trap, was distilled through a 40-cm. low temperature distillation column to give unreacted 1,2-dichloro-1,2,3,3-tetrafluorocyclopropane (27.1 g., 0.15 mole, 80% conversion) and tetrafluorocyclopropane (B.P. −10 to +3° C., 56 g., 0.50 mole, 85% yield).

(weak to medium, and 1200 (strong) cm.$^{-1}$ in addition to other new bands. None of these characteristic absorptions are shown by the homopolymers.

Differential thermal analysis curves of the copolymers were different from those of the said corresponding homopolymers. Those copolymers containing considerable perfluorocyclopropene (comonomer:perfluorocyclopropene ratio <5:1) exhibited a sizeable endotherm around 300° C.

The copolymer of Example 13 was found to have a different infrared spectrum than polyvinylfluoride. It was an elestic copolymer whereas polyvinyl fluoride is not.

TABLE I.—COPOLYMERS OF PERFLUOROCYCLOPROPENE

| Example No. | Vinyl monomer | Mmoles | Reaction time (hrs.) [b] | Weight copolymer (mg.) | Percent F | Monomer/perfluorocyclopropene [c] |
|---|---|---|---|---|---|---|
| 9 | $CH_2=CH_2$ | [a] 3.6 | 21 | 151 | 37.18 | 3.31 |
| 10 | $CH_2=CH_2$ | [a] 2.1 | 8 | 48 | 38.30 | 3.09 |
| 11 | $CH_2=C(CH_3)_2$ | 3.6 | 20 | 78 | 33.68 | 2.02 |
| 12 | $CF_2=CF_2$ | [a] 2.9 | 20.5 | 23 | [d] | [d] |
| 13 | $CH_2=CHF$ | [a] 2.1 | 8 | 25 | [d] | [d] |
| 14 | $CH_2=CF_2$ | [a] 1.4 | 8 | [e] | [d] | [d] |
| 15 | $CH_2=CHCl$ | [a] 1.4 | 8 | 48 | 6.24 | 17.7 |
| 16 | $CH_2=CHC_6H_5$ | [f] 1.3 | 8 | 125 | 2.87 | 24.2 |
| 17 | $CH_2=CHCN$ | [a] 2.3 | [g] | 114 | 1.20 | 117 |
| 18 | $CH_2=CHCN$ | 2.3 | 8 | 110 | 1.23 | 115 |
| 19 | $CH_2=CHOCH_3$ | 2.1 | 8 | 200 | 39.95 | 1.35 |
| 20 | $CH_2=CHOCOCH_3$ | [h] 1.5 | 8 | 191 | 38.30 | 3.09 |
| 21 | Trans-$CH_3CH=CHCH_3$ | 3.4 | 8 | [e] | 25.86 | 3.24 |
| 22 | Cis-$CH_3CH=CHCH_3$ | 3.4 | 8 | [e] | 33.78 | 2.02 |

[a] Equimolar amounts of perfluorocyclopropene.
[b] Heated at 80–85° C.
[c] Mole ratio calculated from elemental F analysis.
[d] No elemental F analysis.
[e] Not weighted.
[f] 1.3 mmoles styrene, 2.1 mmoles perfluorocyclopropene.
[g] Allowed to stand at room temperature for 4 days.
[h] 1.5 mmoles vinyl acetate, 2.1 mmoles perfluorocyclopropene.

EXAMPLE 7

Perfluorocyclopropene/methyl vinyl ether copolymer

Perfluorocyclopropene (16 mmoles), methyl vinyl ether (16.7 mmoles), and benzoyl peroxide (0.01 g., 4.5×10$^{-5}$ moles) were sealed in a glass tube (200 mm. x 8 mm. I.D. x 10 mm. O.D.) and heated at 85° C. for 8 hours to provide a white solid copolymer, 1.94 g., 83% yield) containing 41.6% fluorine. This corresponds to a ratio of 1.2:1 methyl vinyl ether:perfluorocyclopropene. The copolymer was soluble in diethyl ether, acetone, benzene, and tetrahydrofuran. Clear, self-supporting films were pressed at 200° C. and also cast from benzene solution. The copolymer had an inherent viscosity of 0.32 (0.1% benzene solution at 25° C.).

EXAMPLE 8

Perfluorocyclopropene/methyl vinyl ether copolymer

Methyl vinyl ether (3.0 mmoles), perfluorocyclopropene (3.0 mmoles) and azoisobutyronitrile (0.0036 g., 2.2×10$^{-5}$ moles) were sealed in a glass tube (18 mm. x 4 mm. I.D.) and heated at 65° C. for 8 hours. There was obtained 0.59 g. of white solid copolymer containing 42.23% F.; this corresponds to a molar ratio of 1.17:1 methyl vinyl ether:perfluorocyclopropene. The copolymer had an inherent viscosity of 0.58 (0.1% solution in benzene at 25° C.).

EXAMPLES 9–22

Other copolymers of perfluorocyclopropene

Equimolar quantities of perfluorocyclopropene and polymerizable ethylenically unsaturated monomers (see Table I) were added to a glass tube (18 mm. x 4 mm. I.D.) with benzoyl peroxide (5 mg., 2×10$^{-5}$ moles). The tube was degassed, sealed and heated at 80–85° C. The copolymeric product was charatcerized by its infrared spectrum, by differential thermal analysis, and in some cases by fluorine elemental analysis.

The infrared spectrum of each copolymer was different from that of the corresponding homopolymer of the ethylenically unsaturated monomer. Each copolymer had characteristic absorption at 1730–1700 (strong), 1600

EXAMPLE 23

Equimolar quantities of perfluorocyclopropene and tetrafluoroethylene were placed in platinum tubes with catalytic amounts of an initiator, and polymerized at about 3000 atmospheres. Initiators used were azoisobutyronitrile, dinitrogen difluoride and perfluoropropionyl peroxide.

Still another sample of the perfluorocyclopropene and tetrafluoroethylene mixture was polymerized by ultraviolet radiation at 2637A. The monomers were mixed under autogenous pressure in acetone.

The infrared spectra of these copolymers differ from that of poly(tetrafluoroethylene). Also, differential thermal analysis revealed that these polymers have glass transition temperatures and melt endotherm curves differing from those of poly(tetrafluoroethylene).

EXAMPLE 24

Perfluorocyclopropene (2.3 mmoles) and vinyl fluoride (4.7 mmoles) were placed in a 7″ x ⅜″ platinum tube containing 0.05 mmole of azoisobutyronitrile and heated 8 hours at 75° C. under 3000 atmospheres pressure. An elastomeric copolymer was obtained in 50% yield. The infrared spectrum showed absorption bands at 2980, 1490, 1220, 1180, 1080, 920, and 800 cm.$^{-1}$, and differential thermal analysis gave a glass transition temperature of 44° C. These values compare with the following data for vinyl fluoride homopolymer (non-elastomeric) prepared as a control: infrared bands at 2950, 1630, 1450, 1430, 1410, 1360, 1250, 1230, 1140, 1045, 1030, 890, 830, 760, and 720 cm.$^{-1}$; glass transition temperature, 33° C.

EXAMPLE 25

Perfluorocyclopropene (2.3 mmoles) and vinylidene fluoride (4.7 mmoles) were copolymerized with 0.05 mmole of azoisobutyronitrile as initiator by the procedure of Example 24. The copolymer, obtained in 62% yield, showed a glass transition temperature of −30° C. A control sample of vinylidene fluoride homopolymer showed no glass transition temperature.

In addition the monomers listed in Table II below, can be employed in the aforedescribed polymerization process to produce copolymers of the two monomers.

TABLE II

| Cyclopropene | Comonomers |
|---|---|
| $F_2$ cyclopropene (F, F) | $CH_2=CHOC_4H_9$ |
| Same as above | $ClFC=CF_2$ |
| Do | $CF_2=CFOCH_3$ |
| F, Cl cyclopropene (F, F) | $CF_2=CFOCF_3$ |
| Same as above | $CH_2=CHC_6H_{11}$ |
| Do | $CH_2=CHC_6H_{13}$ |
| F, Br cyclopropene (F, F) | $FHC=CHOCH_3$ |
| Same as above | $ClHC=CFCl$ |
| Do | $CF_2=CFCF_3$ |
| F, F cyclopropene (F, F) | $CH_2=CHCO_2CH_3$ |
| F, Cl cyclopropene (F, F) | $CH_2=C(CH_3)-CO_2CH_3$ |
| $F_2$ cyclopropene (F, F) | cyclobutene ($H_2$, $H_2$, H, H) |

The monomers of this invention were identified by ordinary analytical techniques. For example, in addition to the data given in the examples, samples of perfluorocyclopropene gave the following spectral data:

$F^{19}$ n.m.r.: A triplet (J=43.5 c.p.s.) at 5456 c.p.s. (external $Cl_3CF$ reference) and a triplet (J=43.5 c.p.s.) at 8184 c.p.s.

Infrared: 1945 (C=C stretch of a strained ring), 1380, 1340, 1200, (C—F), 930, 890, and 775 cm.$^{-1}$.

Mass spectrum: Formula $C_3F_4$ (molecular weight 112) and required fragments. Considerable $C_3F_3^+$, $CF^+$, and $C_3F_4^+$ fragments.

A sample of 3-chlorotrifluorocyclopropene gave the following time-of-flight mass spectrum: $Cl^{35}/Cl^{37}$ isomer ratio of Cl containing ions verified the presence of one chlorine atom. The parent ions of molecular weight 228 ($Cl^{35}$) and 230 ($Cl^{37}$) were observed, as well as a base peak $C_3F_3^+$ requiring a 3-substituted chlorine.

The starting cyclopropanes employed in the methods for preparing the monomers of this invention can be prepared by conventional literature procedures. For example, the 1,2-dihalo-1,2,3-trifluorocyclopropanes and the 1,2,3-trihalo-1,2,3-trifluorocyclopropanes can be prepared as described by Birchall et al., Proc. Chem. Soc. 1960, 81, and by Mitsch, J. Am. Chem. Soc. 87, 758 (1965).

The monomers of this invention are useful as insecticides, e.g., tetrafluorocyclopropene was toxic to drosophila at concentrations of 1 part in 300. At this concentration the compound was not explosive; the lower explosive limit being about 1.7 parts in 98.3 parts of air.

The copolymers of this invention form clear self-supporting films and find utility in the usual applications for clear films. For example, a copolymer of tetrafluorocyclopropene and methyl vinyl ether was cast from benzene solution.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property of privilege is claimed are defined as follows:
  1. 3-halotrifluorocyclopropenes of the formula

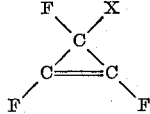

wherein X is fluorine, chlorine or bromine.
  2. The compound of claim 1 wherein X is fluorine.
  3. The compound of claim 1 wherein X is chlorine.

References Cited

UNITED STATES PATENTS 3,335,194   8/1967   West, Jr., et al.

DANIEL D. HORWITZ, Primary Examiner

U.S. Cl. X.R.

Adequately cross-referenced in parent case.